(12) United States Patent
Calvarese et al.

(10) Patent No.: US 7,769,542 B2
(45) Date of Patent: Aug. 3, 2010

(54) MONITORING A LOCATION OF A MOBILE COMPUTING DEVICE

(75) Inventors: Russell Calvarese, Stony Brook, NY (US); Thomas Wulff, No. Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 771 days.

(21) Appl. No.: 11/624,327

(22) Filed: Jan. 18, 2007

(65) Prior Publication Data

US 2008/0174445 A1 Jul. 24, 2008

(51) Int. Cl.
G08B 21/00 (2006.01)
G06F 19/00 (2006.01)

(52) U.S. Cl. .................. 701/211; 701/28; 701/207; 342/357.07

(58) Field of Classification Search .................. 701/211, 701/207, 26, 28, 210, 216, 300; 342/357.01, 342/357.07, 357.08; 340/995.25, 995.28, 340/686.1; 455/456.1
See application file for complete search history.

(56) References Cited

U.S. PATENT DOCUMENTS 7,440,847 B2 * 10/2008 Unuma et al. ............... 701/201
7,539,576 B2 * 5/2009 Ohnishi et al. .............. 701/211
2002/0111737 A1 * 8/2002 Hoisko ....................... 701/209
2002/0165662 A1 * 11/2002 Maruyama et al. .......... 701/200
2003/0093216 A1 * 5/2003 Akiyama .................... 701/200
2004/0193369 A1 * 9/2004 Kokojima et al. ........... 701/209
2005/0060088 A1 * 3/2005 Helal et al. ................. 701/208
2007/0257836 A1 11/2007 Chaplin

OTHER PUBLICATIONS

Pedestrian Tracking with Shoe-Mounted Inertial Sensors by Eric Foxlin—IEEE Computer Graphics and Applications, Nov./Dec. 2005.

* cited by examiner

Primary Examiner—Tan Q Nguyen
(74) Attorney, Agent, or Firm—Thorne & Halajian, LLP

(57) ABSTRACT

A memory for storing constraint data describing a constrained area, a location sensor, and a processor operationally coupled to the memory and location sensor for location tracking. In operation, the device acquires real-time location information from the location sensor and calculates a location within the constrained area utilizing the constraint data and the acquired real-time location information. The location sensor may include an accelerometer that produces signals corresponding to a change in speed and a gyroscope that produces signals corresponding to a direction traveled. The processor may calculate a distance traveled over time utilizing the signals from the accelerometer and calculate the location utilizing the calculated distance traveled over time and the direction traveled.

20 Claims, 4 Drawing Sheets

MONITORING A LOCATION OF A MOBILE COMPUTING DEVICE

FIELD OF THE INVENTION

The present system relates to monitoring a location of a mobile computing device.

BACKGROUND OF THE INVENTION

Supply chain operations require real-time information regarding location of freight and transportation equipment. Global positioning systems (GPS) may assist in identifying an approximate position in an open environment yet typically are not available in an enclosed environment, like inside a building. Warehousing operations require this real-time location information, however provide a less than ideal condition for many forms of location identification. GPS signals typically do not propagate well into building structures. In addition, GPS location data has an inherent inaccuracy of as much as several meters that renders this type of location data of little or no assistance in an environment where this level of inaccuracy may provide an inability to identify one aisle of the warehouse from either immediately adjacent aisles.

Radio Frequency Transmitter Devices (RFIDs) are useful for identifying when an RFID tag attached to the mobile device passes designated locations wherein an RFID reader is positioned, however do not help with real-time tracking. Particularly, RFID-based systems cannot identify a precise location of an RFID tag. These systems only provide information that the RFID tag is within a transmit/receive area of the RFID reader.

Other Real Time Locating Systems (RTLSs) exist that use a triangulation technique to identify a location of the mobile device. In operation, transmitter/receivers in a form of network access points are positioned throughout an area wherein the mobile device travels. The mobile device is arranged to transmit a beacon signal that is receivable by the access points. A time difference of arrival of the beacon signal at the access points is utilized to determine a distance of the mobile device from the access points (typically three or more). The distance from the access points and triangulation techniques are utilized to identify the location of the mobile device. However, these systems are unreliable because an accurate location calculation requires communication with multiple access points. In a warehouse environment, oftentimes a sufficient number of access points may not be receivable due to null points and geometry obstructions. Placement of a sufficient number of additional access points may be cost prohibitive. As a result, the mobile device may be disconnected from the network for periods of time where real-time location data is unavailable.

It is an object of the present system to overcome disadvantages and/or make improvements in the prior art.

SUMMARY OF THE INVENTION

A method, application and device for location tracking. The device includes a memory for storing constraint data describing a constrained area, a location sensor, and a processor operationally coupled to the memory and location sensor. In operation, the device acquires real-time location information from the location sensor and calculates a location within the constrained area utilizing the constraint data and the acquired real-time location information. In one embodiment, the location sensor includes an accelerometer that produces signals corresponding to a change in speed and a gyroscope that produces signals corresponding to a direction traveled. In this embodiment, the processor calculates a distance traveled over time utilizing the signals from the accelerometer and calculates the location utilizing the calculated distance traveled over time and the direction traveled.

The device may include an electronic compass that produces the signals corresponding to a direction traveled and the processor may utilize the signals from the electronic compass and the gyroscope to calculate the location. The constrained area may be a collection of areas accessible to the device surrounding areas inaccessible to the device. In one embodiment, the constrained area may be organized as a grid of areas accessible to the device surrounding areas inaccessible to the device. The location sensor may include a location correction device that produces signals corresponding to location correction data for correcting the calculated location.

The location correction device may include a Radio Frequency Identification Device (RFID) tag that operates to identify when the device approaches an identified location. In this embodiment, the processor may correct a calculated location based on an indication that the device has approached the identified location. In the same or an alternate embodiment, the location correction device may include a camera that operates to identify a location of the device and the processor may correct a calculated location based on the identified location. The location correction device may be two or more access points that operate to identify a location of the device and the processor may correct a calculated location based on the identified location. In one embodiment, the processor may correct the calculated location as a straight line between a previous known location and the current calculated location.

BRIEF DESCRIPTION OF THE DRAWINGS

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system in which.

DETAILED DESCRIPTION OF THE INVENTION

Figure 1:
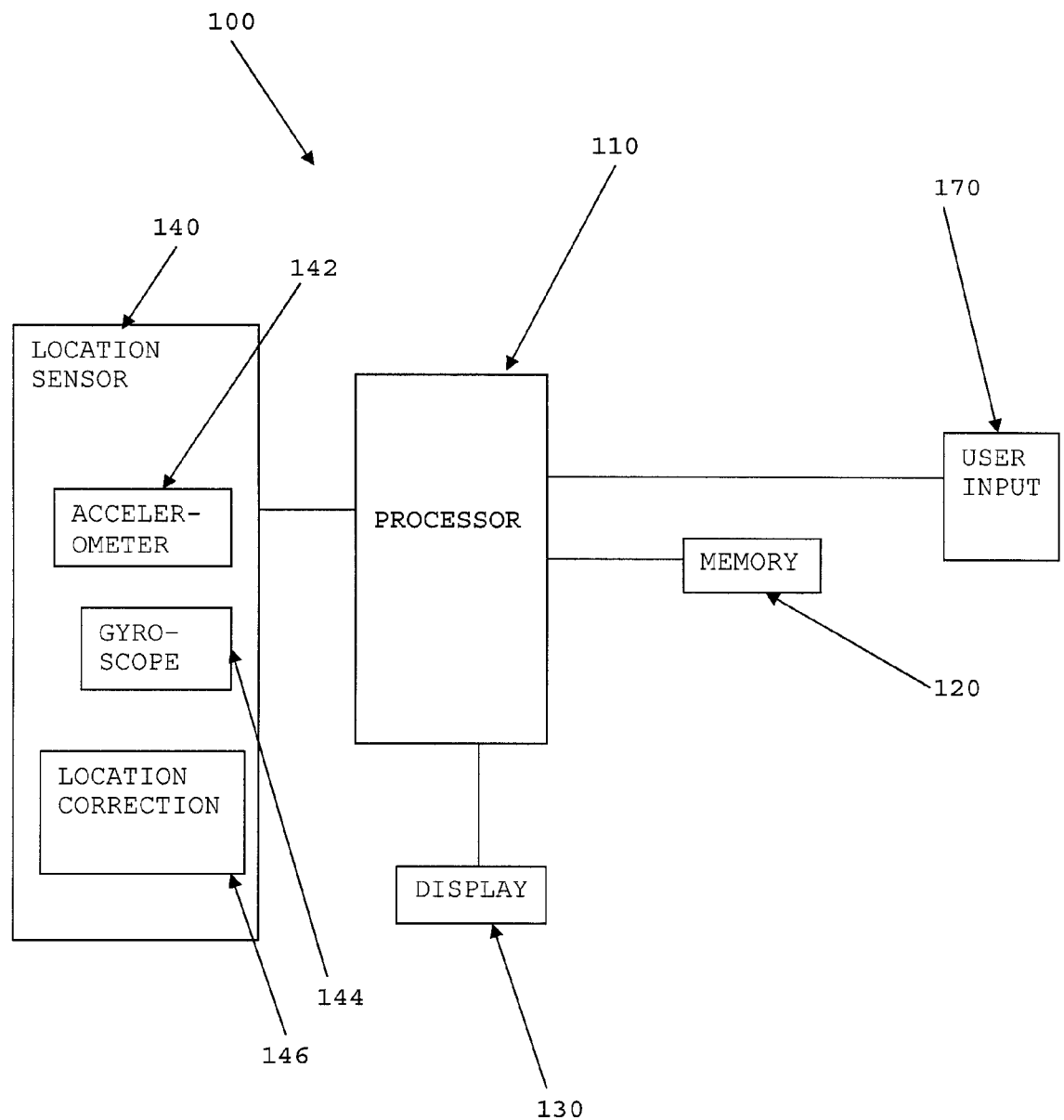
FIG. 1 shows an illustrative system in accordance with an embodiment of the present system.

FIG. 1 shows an illustrative system 100 in accordance with an embodiment of the present system. The system 100 includes a processor 110 operationally coupled to computer readable medium illustrated shown as a memory 120, a user input 170, a display device 130, and a location sensor 140. As is known in the art, the methods and apparatus discussed herein may be distributed as an article of manufacture that itself comprises the memory 120 having computer-readable code embodied thereon. The computer-readable code may be operable, in conjunction with the processor 110, to carry out all or some of the acts to perform the methods or create the apparatus discussed herein. The memory 120 may be a recordable medium (e.g., floppy disks, hard drives, DVD, solid state memory, memory cards, etc.) or may be a transmission medium. Any medium known or developed that can store and/or provide information suitable for use with the system 100 may be used.

In one embodiment, the memory 120 configures the processor 110 to implement the methods, acts, and functions disclosed herein. The memory 120 may be distributed or local and the processor 110 may be distributed or singular. For example, the location sensor 140 may contain a portion of the processor 110 and/or the memory 120 for performing some of the acts described herein and others. The memory 120 may be implemented as electrical, magnetic or optical memory, or any combination of these or other types of storage devices. Moreover, the term "memory" should be construed broadly enough to encompass any information able to be read from or written to an address in an addressable space accessible by the processor 110. With this definition, information on a network is still within the memory 120 since the processor 110 may retrieve/write the information from/to the network. It should also be noted that some or all of operations described herein may be incorporated into an application-specific or general-use integrated circuit including the operation of the processor 110 and the memory 120.

Further, the processor 110 may be a dedicated processor for performing in accordance with the present system or may be a general-purpose processor wherein only one of many functions operates for performing in accordance with the present system. The processor 110 may operate utilizing a program portion, multiple program segments, or may be a hardware device utilizing a dedicated or multi-purpose integrated circuit.

The processor 110 is operationally coupled to the user input 170 to facilitate operation within a user interface that may be provided on the display 130. The user input 170 may be utilized for user interaction with the present system, such as initializing and/or correcting a determined or starting location of the present system. The location sensor may include one or more location sensor elements, such as an accelerometer 142, a gyroscope 144, and a location correction device 146, such as a camera, RFID tag, and/or other systems of the like that can provide additional location information beyond that available by the accelerometer 142 and the gyroscope 144. As may be readily appreciated by a person of ordinary skill in the art, the gyroscope may be readily replaced with another device suitable for identifying a direction traveled, such as an electronic compass. These suitable further embodiments are intended to be encompassed by the present system unless specifically stated otherwise.

While each of the sensor elements are illustrated as within the location sensor 140 shown in FIG. 1, this is merely intended as a functional limitation in that any one or more of the sensor elements may operate synergistically yet be provided in different physical locations and/or enclosures. However, as would be readily apparent to a person of ordinary skill in the art, this clearly does not introduce any physical limitations on an actual placement of the sensor elements. For example, the accelerometer 142 may be positioned on a foot of a surveyor, for example as a foot mounted pedometer, while the location correction device 146, such as a head-mounted camera or imaging system, may be positioned on a head of the surveyor.

Figure 2:
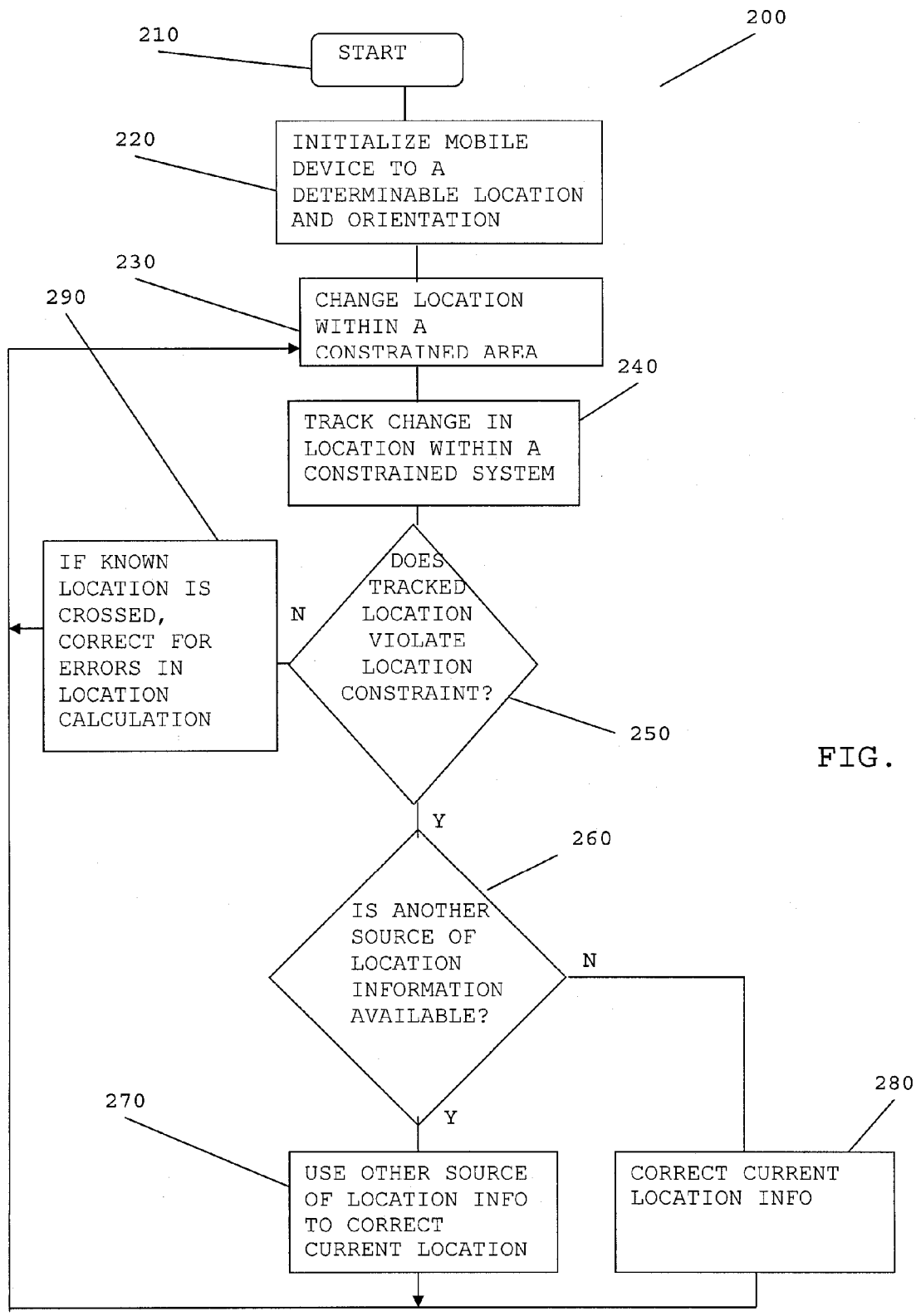
FIG. 2 shows a flow diagram illustrating an operation in accordance with an embodiment of the present system.

Further operation of the present system will be presented in conjunction with FIG. 2 which shows a flow diagram 200 illustrating an operation in accordance with an embodiment of the present system. In accordance with the present system, a starting act, such as turning on the system 100, is performed during act 210. During act 220, the mobile device is initialized to a determinable location and orientation. By the term determinable, what is intended is that the location and orientation, such as heading, of the mobile device may be identified by any suitable means including user intervention and/or autonomous means independent of user intervention. For example, in one embodiment, the present system may be initialized by conveying that the device is currently located at a previously known identified location and orientation. This information may be manually transferred to the processor such as by a user suitably manipulating the user input 170. In another embodiment, a triangulation of access points may be utilized to initialize the device. In a further embodiment, an RFID system may be utilized to initialize the system. Other systems, devices, and/or combinations of systems and devices for identifying a starting location to the system would readily occur to a person of ordinary skill in the art and are intended to be encompassed by the present system.

Regardless of how a starting location is determined, thereafter during act 230 the mobile device changes location by a measured amount and direction within a constrained area as determined by the location sensor 140. As utilized herein, a constrained area is an area wherein the freedom of motion is constrained to less than a total area present. For example, in a warehouse environment, the freedom for motion of the mobile device is constrained to known locations of aisles and intersections. Other areas of the warehouse are not accessible to the mobile device as these areas are typically occupied by shelving, walls, and other immovable objects of the like. In one embodiment, the accessible areas may be laid out in a grid-like pattern. In this embodiment, the accessible portions may intersect each other at a substantially ninety-degree angle (e.g., 75-105 degree angle) as may be readily appreciated. As the term grid is utilized herein, what is intended is that there are a series of intersecting accessible and inaccessible areas. In some embodiments, the intersecting areas need-not necessarily intersect at ninety-degree angles or even at substantially ninety-degree angles. In one embodiment, one or more intersections may be at substantially a ninety-degree angle while one or more other intersections are at some other angle of intersection. In another embodiment, all angles of intersection are not substantially ninety-degree angles. As may be readily appreciated, accessible areas may surround inaccessible areas or vice-a-versa. Further, accessible areas may surround only portions of the inaccessible area and vice-a-versa. For example, an accessible area may surround a portion of an inaccessible area, however, the inaccessible area may dead-end to an inaccessible area, such as a wall, shelf, etc. that is not surrounded by an accessible area. Other variations of accessible and inaccessible portions would readily occur to a person of ordinary skill in the art and are intended to be encompassed by the present system. In accordance with the present system, the locations of known accessibility limitations may be available to the processor 110, such as stored in the memory 120, and may be utilized to improve an accuracy of location identification as described further herein.

In operation, the accelerometer 142 may be utilized to calculate a speed and distance traveled within the constrained area. The gyroscope 144 may be utilized to determine any changes in direction from the initial orientation. In one embodiment, either or both of the accelerometer 142 and gyroscope 144 may be fabricated as a microelectromechanical system (MEMS). Utilization of a MEMS fabrication process enables an integration of the mechanical elements of the accelerometer and gyroscope, along with electronics arranged to support operation of the devices. In accordance with MEMS techniques, electronics are fabricated using integrated circuit (IC) process sequences (e.g., CMOS, Bipolar, or BICMOS processes) while the micromechanical components are fabricated using compatible "micromachining" processes.

In an alternate embodiment, inertial guidance systems may be similarly utilized to identify the distance traveled and direction of travel, such as described in "Pedestrian Tracking with Shoe-Mounted Inertial Sensors", by Eric Foxlin, IEEE Publication, Moving Mixed Reality into the Real World, November/December 2005, incorporated herein as if set out in entirety. Other systems such as described in U.S. patent application Ser. No. 11/429,501, entitled "Site Survey Tracking", assigned to the assignee of the present patent application and incorporated herein as if set out in its entirety, may also be utilized for tracking a location of the mobile device. As may be readily appreciated, other systems may be suitably utilized for calculating the distance and direction of travel within the constrained area.

In any event, during act 250, it is determined whether the calculated distance and direction of travel violates restrictions placed on travel by the constrained system. For example, due to inherent inaccuracies (e.g., drift error) in the systems utilized for tracking the distance and/or direction of travel, a calculated location may place the mobile device beyond one of the area constraints, such as past a previous aisle of travel. In this event, the present system recognizes that the calculated location is not a possible actual location for the mobile device and a correction of the location is calculated.

Figure 3:
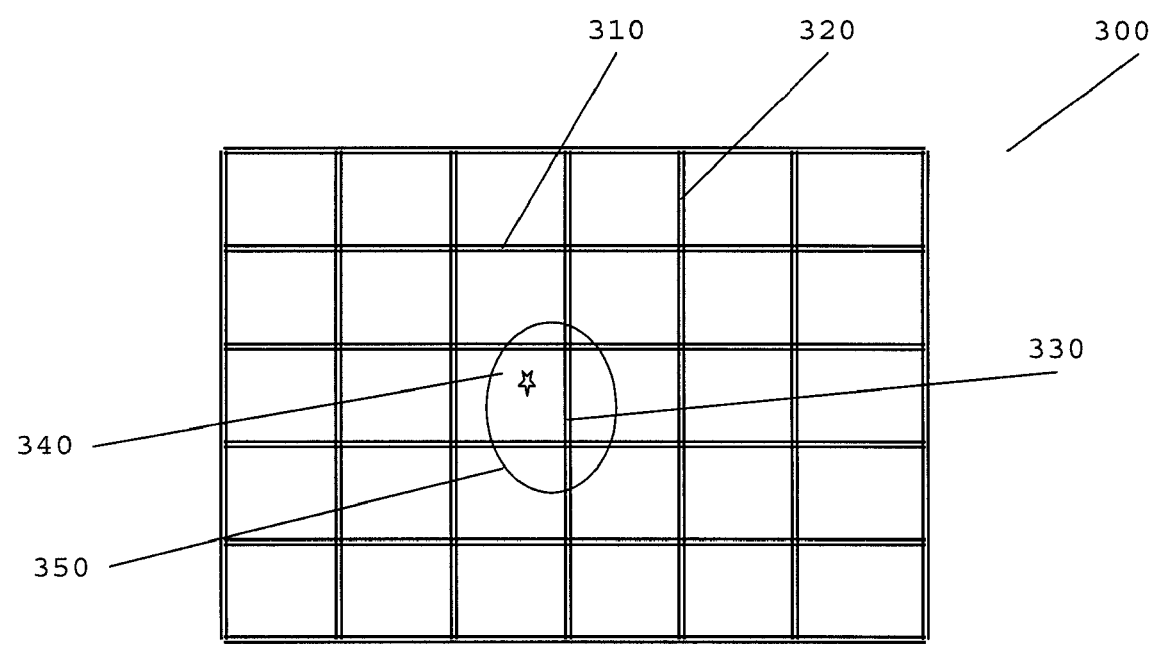
FIG. 3 shows a illustrative example of a constrained area in accordance with an embodiment of the present system.

FIG. 3 shows an illustrative example of a constrained area 300 in accordance with an embodiment of the present system. In this embodiment, the area is constrained to passage within a grid-like pattern of horizontally depicted aisles 310 and vertically depicted aisles 320. In this embodiment, travel outside of the aisles 310, 320 is blocked by obstructions, such as shelving, walls, equipment, etc. In operation, a mobile device may start at a known location 330 that is centrally located within the aisle 320. Some time thereafter, during act 240, a calculated location of the mobile device may be location 340. During act 250, it is determined that the calculated location 340 violates a constraint of the area, in that the calculated location no longer is within the aisle 320. Further, it may be determined that the calculated location is also not within an aisle 310.

Figure 4:
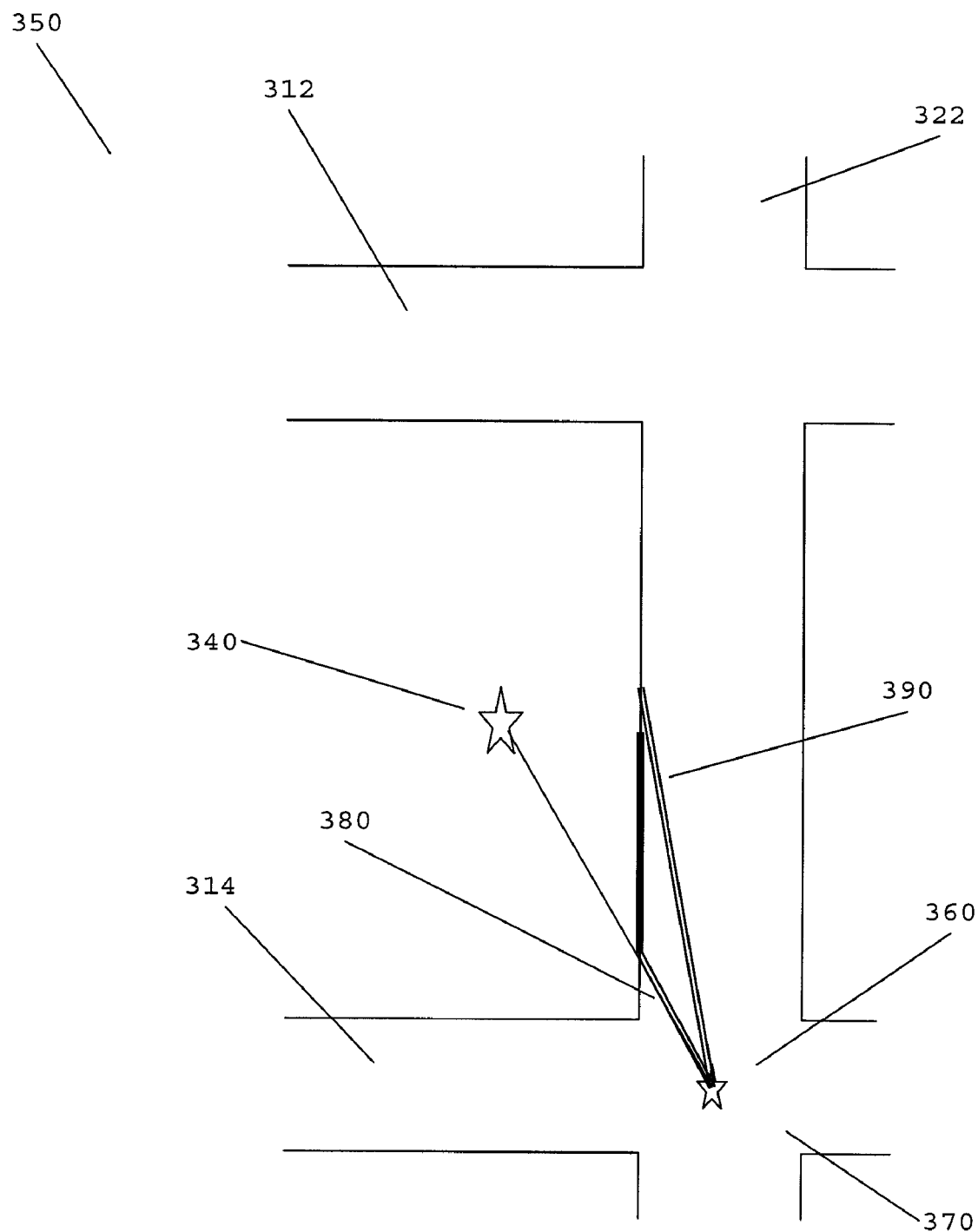
FIG. 4 shows a detailed portion of FIG. 3.

FIG. 4 shows a detailed portion 350 of FIG. 3. The detailed view includes a vertical aisle 322 and horizontal aisles 312, 314. Location 360 identifies a location within an intersection 370 wherein the mobile device location was previously determined by any one or more of suitable systems including by calculations such as provided in FIG. 2 and/or as provided by a location correction device 146 of the location sensor 140 shown in FIG. 1. For example, the location correction device 146 may be a camera mounted on the mobile device and/or positioned within the area such as to provide a field of view that includes the intersection 370. In this embodiment, a computer vision system as may be readily appreciated may provide position confirmation/correction information to the processor 110 to confirm the location of the mobile device within the aisle 322.

In a further embodiment, the location correction device 146 may be provided by an RFID tag and a tag reader. For example, the tag reader in this embodiment may be positioned such as to identify when the mobile device leaves an intersection and enters a particular aisle portion. In this way, tag readers may be dispersed throughout the area to provide similar information at other intersections without requiring tag readers along all portions of the aisles. Similarly, access points may be provided as the location correction device 146 to identify locations of the mobile device at particular locations again without requiring the infrastructure to cover all of the aisle portions. In a further embodiment, one or more markings may exist along portions of the aisles, such as within an intersection, which identifies a known location to provide a user an opportunity to provide confirmation/correction position information, for example, through suitable application of the user input 170. As may be readily appreciated, other systems may be provided to identify a location of the mobile device periodically or several systems may be combined and utilized similarly. In this way, confirmation/correction information may be provided to reduce potential error drift that may be inherent in the location sensor of the present system.

Regardless of how location 360 is provided to the system, when the system determines the location 340 in violation of the constrained system, the present system during act 260 determines whether a source of location correction is available (e.g., location correction device 146 of FIG. 1). If a source of location correction is available, the present system corrects the location during act 270 and awaits a further change in location (e.g., act 230). In a case wherein location correction is unavailable, the current location is corrected during act 280. In one embodiment, location correction may be provided by a user manually entering location correction information. In another embodiment, the present system may utilize the calculated distance traveled may be utilized, together with the system constraints to calculate an approximate location. In one embodiment, the approximate location may be calculated by utilizing the previously calculated location and direction of travel up to a point wherein the area constraint is violated, and thereafter utilizing the additional distance traveled as following the constraint, but not violating it. A path 380 in this embodiment continues until position correction may be provided. In an alternate embodiment, the present system may convert the calculated location to a straight path 390 that does not violate the constraint, the path 390 having a distance traveled equal to the calculated distance traveled but having a direction traveled that is corrected to not violate the constraint. For example, upon each calculated location during act 230, the direction traveled may be corrected to provide a new straight path that does not violate the constrained area, such as by following a perimeter of the constraint, however without violating the constraint. Accordingly, new locations may be calculated until a position correction is enabled as described previously. Naturally, position correction may be provided by the location correction device 146 as previously described for identifying location 360.

In a case wherein during act 250, the calculated location does not violate the constrained area, in accordance with an embodiment of the present system, a determination is made whether a known location has been traversed or whether the location correction device 146 may provide location correction during act 290, whereafter, the system may wait for a further change in location during act 230.

Although location correction as shown in FIG. 2 is provided during identified acts, however, as would readily be apparent to a person of ordinary skill in the art, correction in the calculated location may occur at any time even simultaneously during other acts for a processor 110 that has an ability to multitask or quasi-multitask like in a carouselling task enabled processor.

Of course, it is to be appreciated that in accordance with the present system, any one of the above, elements, embodiments and/or processes may be combined with one or more other elements, embodiments and/or processes. For example, several interactions of the location sensor 140 elements (e.g., camera 141, ranging sensor 142, etc.) are described, yet a potentially larger number of interactions would readily occur to a person of ordinary skill in the art. These and other variations should be understood to be within the scope of the presented claims. Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The claimed invention is:

1. A location tracking device comprising:
   a memory configured to store constraint data describing a constrained area;
   a location sensor; and
   a processor operationally coupled to the memory and location sensor, wherein the processor is configured to acquire real-time location information from the location sensor, and is configured to calculate a location within the constrained area utilizing the constraint data and the acquired real-time location information, wherein the processor is configured to utilize the constraint data to correct the acquired real-time location information to calculate the location.

2. The device of claim 1, wherein the location sensor comprises:
   an accelerometer configured to produce electrical signals corresponding to a change in speed; and
   a gyroscope configured to produce electrical signals corresponding to a direction traveled, wherein the processor is configured to calculate a distance traveled over time utilizing the electrical signals from the accelerometer, and is configured to calculate the location utilizing the calculated distance traveled over time and the direction traveled.

3. The device of claim 1, wherein the location sensor comprises:
   an accelerometer configured to produce electrical signals corresponding to a change in speed allowing for a calculation of distance traveled over time; and
   an electronic compass configured to produce electrical signals corresponding to a direction traveled, wherein the processor is configured to utilize the electrical signals from the electronic compass and the gyroscope to calculate the location.

4. The device of claim 1, wherein the constrained area is a grid of areas accessible to the device surrounding areas inaccessible to the device.

5. The device of claim 1, wherein the constrained area is a collection of areas accessible to the device surrounding areas inaccessible to the device.

6. The device of claim 1, wherein the location sensor comprises a location correction device configured to produce electrical signals corresponding to location correction data for correcting the calculated location.

7. The device of claim 6, wherein the location correction device is a Radio Frequency Identification Device (RFID) tag that operates to identify when the device approaches an identified location, and wherein the processor is configured to correct a calculated location based on an indication that the device has approached the identified location.

8. The device of claim 6, wherein the location correction device is a camera that operates to identify a location of the device, and wherein the processor is configured to correct a calculated location based on the identified location.

9. The device of claim 6, wherein the location correction device is a plurality of access points that operate to identify a location of the device, and wherein the processor is configured to correct a calculated location based on the identified location.

10. The device of claim 1, wherein the processor is configured to correct the calculated location as a straight line between a previous known location and the current calculated location.

11. An application embodied on a computer readable medium configured to aid in tracking a device within a constrained area, the application comprising:
    a portion configured to store constraint data describing the constrained area;
    a portion configured to acquire real-time location information; and
    a portion configured to calculate a location within the constrained area utilizing the constraint data and the acquired real-time location information, wherein the portion configured to calculate the location is configured to utilize the constraint data to correct the acquired real-time location information.

12. The application of claim 11, comprising:
    a portion configured to receive signals corresponding to a change in speed;
    a portion configured to calculate a distance traveled over time from the change in speed;
    a portion configured to receive signals corresponding to a direction traveled; and
    a portion configured to utilize the calculated distance traveled over time and the received signals corresponding to the direction traveled to calculate the location.

13. The application of claim 11, wherein the constrained area is a grid of accessible areas surrounding inaccessible areas.

14. The application of claim 11, wherein the constrained area is a collection of accessible areas surrounding inaccessible areas.

15. The application of claim 11, comprising:
a portion configured to receive electrical signals corresponding to location correction data; and
a portion configured to correct the calculated location utilizing the location correction data.

16. A method of tracking a device within a constrained area, the method comprising acts of:
storing constraint data describing the constrained area;
acquiring real-time location information; and
calculating a location within the constrained area utilizing the constraint data and the acquired real-time location information, wherein the act of calculating the location comprises an act of utilizing the constraint data to correct the acquired real-time location information.

17. The method of claim 16, comprising acts of:
receiving signals corresponding to a change in speed;
calculating a distance traveled over time from the change in speed;
receiving signals corresponding to a direction traveled; and
calculating the location utilizing the calculated distance traveled over time and the received signals corresponding to the direction traveled.

18. The method of claim 16, wherein the constrained area is a grid of accessible areas surrounding inaccessible areas.

19. The method of claim 16, wherein the constrained area is a collection of accessible areas surrounding inaccessible areas.

20. The method of claim 16, comprising the acts of:
receiving electrical signals corresponding to location correction data; and
correcting the calculated location utilizing the location correction data.

* * * * *